United States Patent
Payne

[11] Patent Number: 5,967,463
[45] Date of Patent: Oct. 19, 1999

[54] AIR FOIL HAVING VALVE

[76] Inventor: Loyd D. Payne, 2348 John Glen Dr., Atlanta, Ga. 30341

[21] Appl. No.: 08/961,898

[22] Filed: Oct. 31, 1997

Related U.S. Application Data

[60] Provisional application No. 60/036,647, Jan. 29, 1997, and provisional application No. 60/050,075, Jun. 17, 1997.

[51] Int. Cl.$^6$ .................................................. B64D 17/02
[52] U.S. Cl. .......................... 244/145; 244/142; 244/146
[58] Field of Search ................................... 244/145, 146, 244/142, 152

[56] References Cited

U.S. PATENT DOCUMENTS

| | | |
|---|---|---|
| 3,524,613 | 8/1970 | Reuter et al. . |
| 3,749,337 | 7/1973 | Jalbert . |
| 3,816,867 | 6/1974 | Shirzad et al. . |
| 3,822,844 | 7/1974 | Sutton . |
| 3,893,641 | 7/1975 | Sutton . |
| 3,995,799 | 12/1976 | Bartolini . |
| 4,050,657 | 9/1977 | Murphy . |
| 4,105,173 | 8/1978 | Bucker . |
| 4,191,349 | 3/1980 | Pravaz . |
| 4,389,031 | 6/1983 | Whittington . |
| 4,399,969 | 8/1983 | Gargano . |
| 4,562,981 | 1/1986 | Smith et al. . |
| 4,637,576 | 1/1987 | Ravnitzky . |
| 4,705,238 | 11/1987 | Gargano . |
| 4,776,538 | 10/1988 | Ravnitzky . |
| 4,793,575 | 12/1988 | Butler . |
| 4,846,424 | 7/1989 | Prouty . |
| 4,930,728 | 6/1990 | Wittington . |
| 5,012,993 | 5/1991 | Schafroth . |
| 5,028,018 | 7/1991 | Krebber . |
| 5,082,210 | 1/1992 | Morehead, Jr. . |
| 5,120,081 | 6/1992 | Longoria et al. . |
| 5,160,100 | 11/1992 | Snyder . |
| 5,169,092 | 12/1992 | Murakami . |
| 5,197,696 | 3/1993 | Coe . |
| 5,201,482 | 4/1993 | Ream . |
| 5,303,883 | 4/1994 | Brewer et al. . |
| 5,368,259 | 11/1994 | Tabor . |
| 5,573,207 | 11/1996 | Germain . |

FOREIGN PATENT DOCUMENTS

| | | |
|---|---|---|
| 2 588 791 | of 0000 | France . |
| 2614267 | 4/1987 | France . |
| 2 633 248 | 6/1988 | France . |

*Primary Examiner*—Charles T. Jordan
*Assistant Examiner*—Tien Dinh
*Attorney, Agent, or Firm*—Jones & Askew, LLP

[57] ABSTRACT

A canopy-type parachute is provided which includes improved stability features and lends itself to relatively easy assembly. Integral valves promote stability of the airfoil by not allowing rapid deflation of the airfoil, and their location and orientation within the airfoil promote structural rigidly of the overall airfoil, even out to the front top edge of the airfoil. The valves in one configuration bias against a vertical, loaded rib which tends to provide a consistent taut and planar surface for the valves to bias and act against.

10 Claims, 10 Drawing Sheets

AIR FOIL HAVING VALVE

RELATED APPLICATIONS

The present application claims the benefit of and incorporates by reference prior filed provisional applications 60/036,647 and 60/050,075, filed Jan. 29, 1997, and Jun. 17, 1997, respectively.

TECHNICAL FIELD

The present invention relates to parachuting, and particularly relates to a canopy-style parachute design which includes the use of valves which provide integrity to the canopy.

BACKGROUND OF THE INVENTION

Numerous devices are known in the prior art for controlling the vertical and horizontal passage of an article through a predetermined fluid environment. Such devices can generally by classified within one of two broad classifications; submarine and diving wing constructions for use in fluid environments, and flexible parachute constructions and rigid airfoil constructions used in gaseous environment. The present invention, while usable in devices in both classifications, is intended for use primarily in the later classification and particularly with inflatable glide parachute configurations using cellular construction and ram air principles.

Since prior to the advent of gliding parachutes, for many years, parachutes were constructed by sewing a plurality of panels together to define a hemispherical structure when inflated. Some of these domelike parachutes have incorporated slits, vents, or baffles for controlling the flow of air therethrough, both to facilitate deployment and to provide maneuverability. However, these parachutes are adapted primarily for nearly vertical descent, and generally do not prevent a load to be guided over substantial horizontal distances to a target landing area.

Recently, gliding parachutes have been developed for sport jumping, fire fighting, and military applications which can be readily manipulated to carry a load over a substantial horizontal distance. A typical gliding parachute is preformed and constructed in such a manner that when inflated it will define an airfoil in crossection. When a load is suspended from this type of inflated parachute, the parachute will glide forwardly and its airfoil shape will provide the necessary lift. By controlling the peripheral edges of the gliding parachute, the parachute and the load can be guided in their path of descent to a distant target. Numerous patents have been issued for ram air type gliding parachutes. U.S. Pat. No. 4,771,970 to Sutton, U.S. Pat. No. 4,729,530 to Jalbert, U.S. Pat. No. 4,705,238 to Gargano, and U.S. Pat. No. 5,537,207 to Germain, disclose recent examples of such ram air type parachutes.

Much emphases has been placed on the fabric and the rigging of configurations of previous gliding parachutes in an effort to approximate, as close as possible, a conventional airfoil shape. This results in maximum lift for a given parachute area which in turn provides maximum glide.

In a multi-cell gliding parachute, upper and lower fabric canopies are connected by laterally spaced fabric ribs. Suspension or support lines are connected at their upper ends to the parachute either directly or through flares, and converge downwardly to a harness or other load support structure. A plurality of control lines are connected at or near the trailing end of the parachute towards each side to permit control of steering and breaking. The fabric sections of the parachute are normally made of a high strength, lightweight fabric of suitable porosity.

One of the primary goals of inflatable multicell gliding parachutes using ram air type operation is to provide stability and maneuverability which are controllable both vertically and horizontally as the parachute travels through the atmosphere. it is desired to create a parachute which simultaneously minimizes bulk and weight and which is controllable through the vast array of maneuvers. However, while substantial steps have been taken towards this end in recent ends, further improvement is necessary and desired.

One manner in which the prior has addressed the provision of stability to such gliding parachutes is by providing "valves" within the multicell structure, which allow for the inflation of the air foil to a certain degree, with the valves tending to allow entry of air within the air foil, but discouraging the outward flow of air thereby. One such configuration is shown in U.S. Pat. No. 5,573,207 to Germain issued Nov. 12, 1996. In the configuration shown by example in Germain's FIG. 6, valve panels 39 are positioned within adjacent "cells" 34, with the inlet 37 of each cell 34 forming an air scope that serves as the opening into each cell through which the air flows to inflate the cells 34. In the embodiment shown there is at least one non-return valve 38 positioned within at least one, but preferably each, of the plurality of cells 34 that permits the flow of air into but resists the air flow out of each cell. In the configuration shown, each first valve may include a panel 39 of flexible material, which may suitable be zero permeability rip stock nylon of the like, having a bottom edge 40 positioned adjacent the bottom skin 14 and a top edge 42 position adjacent the top skin 12, with at least one of these edges being moveable.

Although the above-referenced configurations have their own advantages, they still have disadvantages. For example, the Germain reference has its free edges of its valve adjacent either the top or the bottom skins. This does not tend to stabilize the top leading edge of the canopy as does the invention described below. This is considered important by the applicant.

Therefore, it may be seen that a need exists for a canopy-type parachute which includes improved stability features, yet lends itself to relatively easy assembly. If valves are to be used, they should promote stability of the air foil by not allowing rapid deflation of the air foil, and their location and orientation should promote structural rigidity of the overall air foil, even out to the front top edge of the air foil. The valves used should preferably biased against a consistently taut surface, which provides a suitable base against which the valves can act and provide a valving action thereby.

SUMMARY OF THE INVENTION

The present invention overcomes deficiencies in the prior art by providing a canopy-type parachute which includes improved stability features and lends itself to relatively easy assembly. Integral valves promote stability of the airfoil by not allowing rapid deflation of the airfoil, and their location and orientation within the airfoil promotes structural rigidly of the overall airfoil, even out to the front top edge of the airfoil. The valves in one configuration bias against a vertical, loaded rib which tends to provide a consistent taut and planar surface for the valves to bias and act against.

Therefore it is an object of the present invention to provide an improved canopy-type air foil.

It is a further object of the present invention to provide an improved canopy-type air foil which is relatively easy to assemble.

It is a further object of the present invention to provide an improved canopy-type air foil which is relatively easy to use.

It is a further object of the present invention to provide an improved canopy-type air foil which includes improved structural characteristics.

It is a further object of the present invention to provide an improved canopy-type air foil which includes an improved internal valve.

It is a further object of the present invention to provide an improved canopy-type air foil which includes an improved internal valve which provides improved structural characteristics.

It is an object of the present invention to provide an air foil which has improved stabilization characteristics.

It is a further object of the present invention to provide an air foil which has improved stabilization characteristics along it front edge.

It is a further object of the present invention to provide an improved canopy-type airfoil which does not allow for rapid deflation.

It is a further object of the present invention to provide an improved-canopy-type airfoil which includes increased rigidly, which improves performance.

It is a further object of the present invention to provide an improved canopy-type airfoil which allows for the smooth introduction of air.

Other objects, features, and advantages of the present invention will become apparent upon reading the following detailed description of the preferred embodiment of the invention when taken in conjunction with the drawing and the appended claims.

DETAILED DESCRIPTION OF THE PREFERRED EMBODIMENT

I. General Discussion

Figure 1:
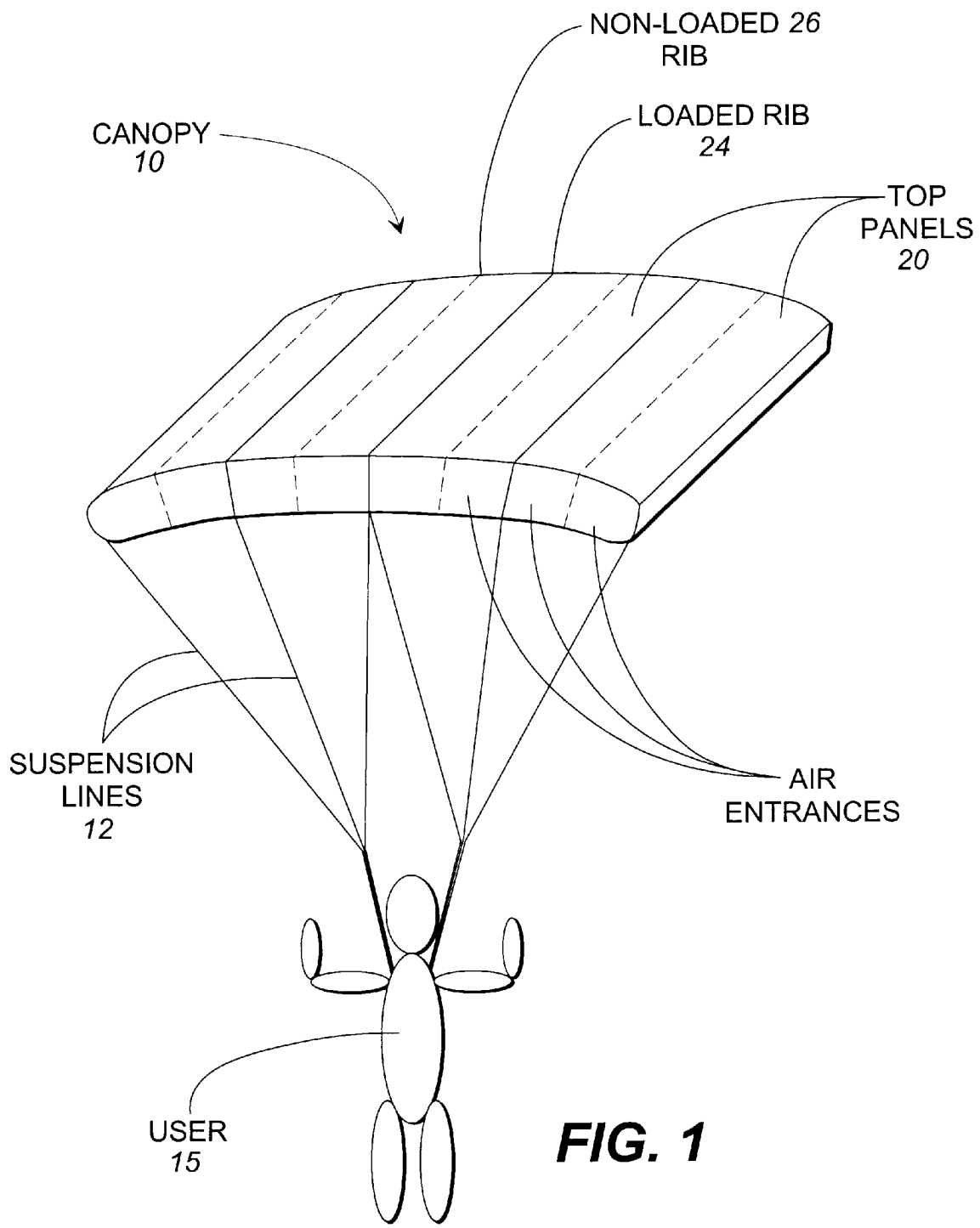
FIG. 1 shows a canopy-type parachute system including a canopy 10 under which a user 15 is suspended by the use of a number of suspension ropes or "lines" 12. This design shows a 4- "cell" design, although conventionally, 5 to 7 "cell" designs are used, although up to 21 and even higher numbers of cells could be used.
Figure 2:
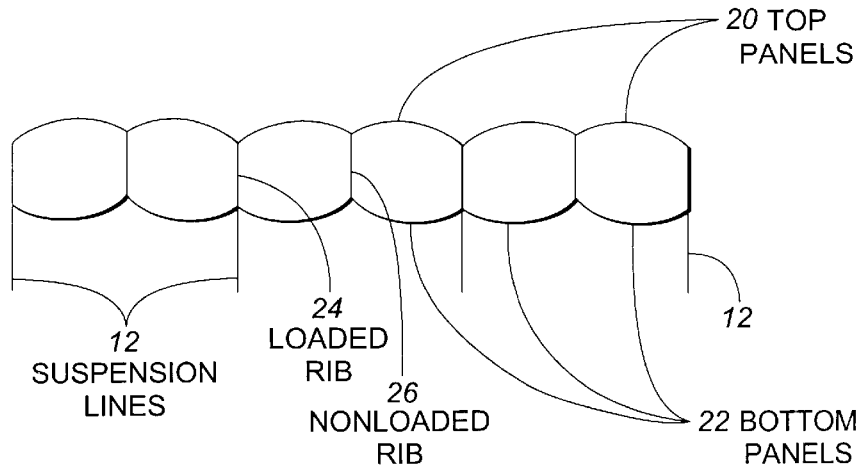
FIG. 2 is an end illustrative cross-sectional view showing the interaction of a portion of the airfoil 10 showing three (3) cells, six (6) air channels, seven (7) rib panels, and four (4) front suspension lines, although more suspension lines are used.

In essence, the invention relates to the use of a canopy-type parachute which is essentially a multi-channeled wing which including the use of valves in the leading "mouths" of open-ended elongate channels. The valves substantially close the mouths of the channels although one edge of the each valve portion is free, that is, it is not sewn, to allow air to pass thereby in preferably one direction. This air then fills the channels, such that some integrity is provided, performing somewhat like a multi-channeled air mattress which acts like a foil to provide a "gliding" action to a user attached underneath.

II. Detailed Discussion

A. The Various Elements

A discussion will now be made of the various elements included in the first airfoil embodiment 10 according to the present invention.

1. The Canopy Generally

Referring generally to FIGS. 1–4 and 12, the first airfoil embodiment 10 (a.k.a. a "canopy" or "airfoil") according to the present invention includes a plurality of top panels 20 (which combine together to comprise a single top "skin"), a plurality of bottom panels 22 (which combine together to comprise a single bottom "skin"), a plurality of non-loaded vertical rib panels 26, and a plurality of loaded vertical rib panels 24.

2. The Top Panels

Figure 5:
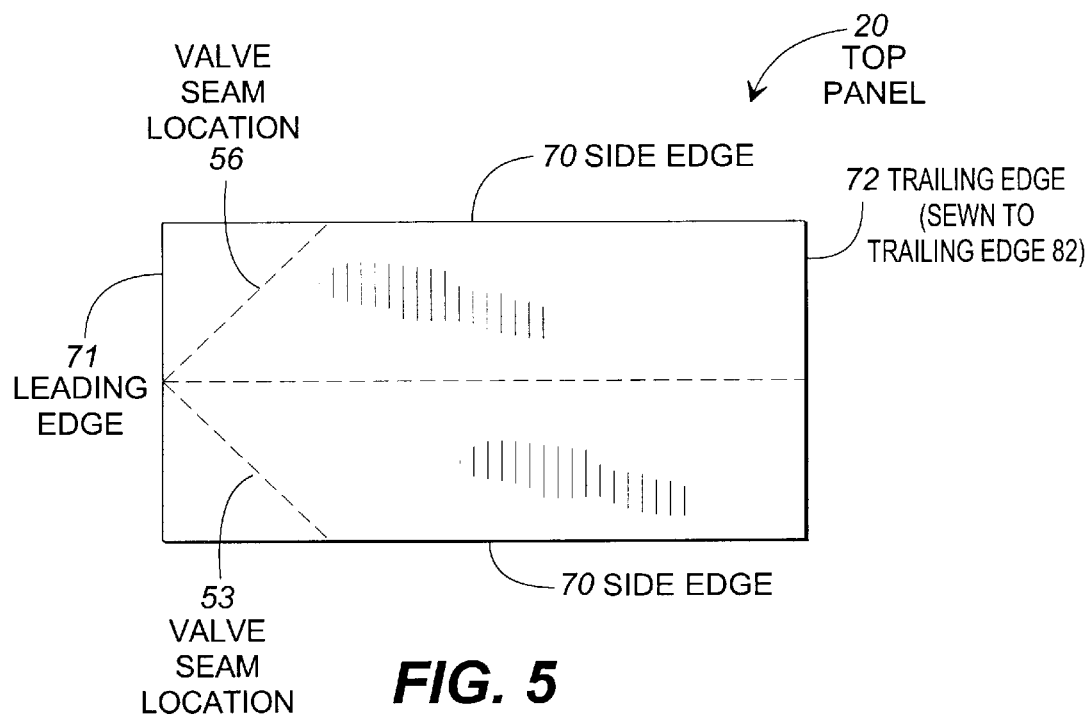
FIG. 5 is a top plan isolated view of a top panel blank 20.
Figure 6:
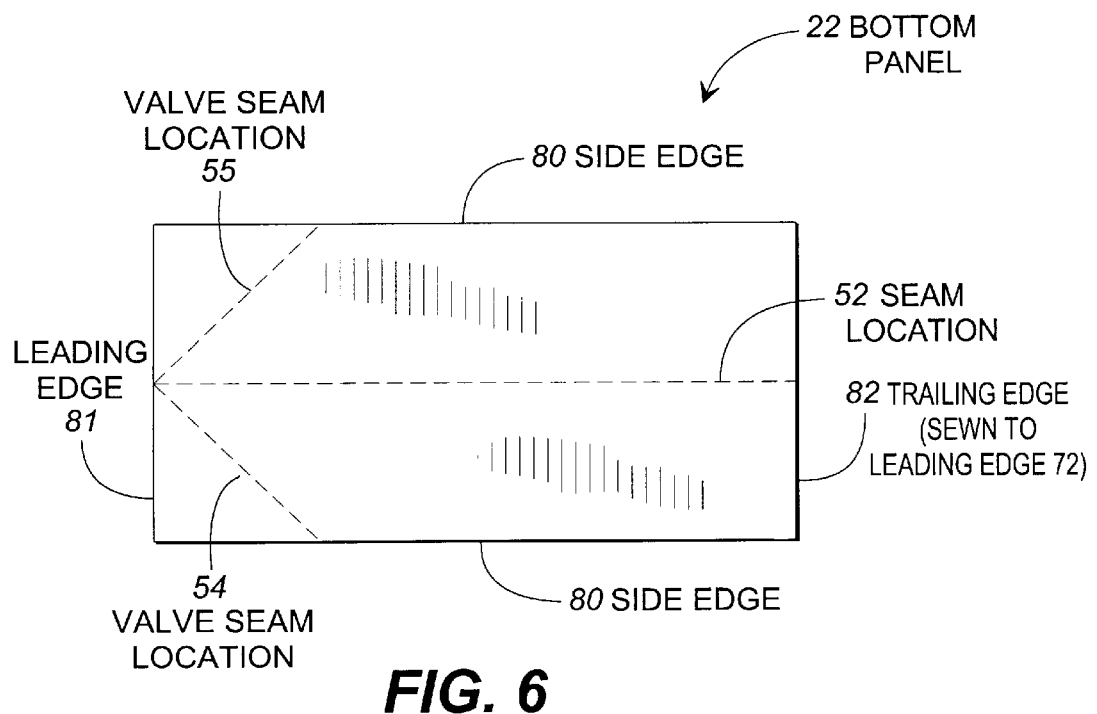
FIG. 6 is a plan isolated view of a bottom panel blank 22.

Referring particularly to FIG. 5, the top panels 20 are each substantially similar in shape and construction, in that they are substantially rectangular and composed of a single sheet of fabric. Each top panel 20 includes two opposing side edges 70, a leading edge 71, and a trailing edge 72. Eventual seam locations 51, 56, and 57 are shown in dotted line.

As discussed in detail elsewhere in this discussion, when installed, the top panels 20 each have one side edge 70 attached at a seam to the upper edge of a loaded rib panel (along with the side edge of another adjacent "second") top panel), and the other side edge attached at a seam to the upper edge of another loaded rib panel (along with the side edge of another oppositely adjacent "third" top panel).

3. The Bottom Panels

Referring now also to FIG. 5, the bottom panels 22 are each substantially similar in shape and construction, in that they are substantially rectangular and composed of a single sheet of fabric. Each bottom panel 22 includes two opposing side edges 80, a leading edge 81, and a trailing edge 82. Seam locations 52, 54, and 55 are shown in dotted line.

As discussed in detail elsewhere in this discussion, when installed the bottom panels 22 each have one side edge 80 attached to the lower edge of a loaded rib panel (along with the side edge of another adjacent "second" bottom panel), and the other side edge attached to the bottom edge of another loaded rib panel (along with the side edge of another oppositely adjacent "third" bottom panel).

4. The Ribs

Figure 12:
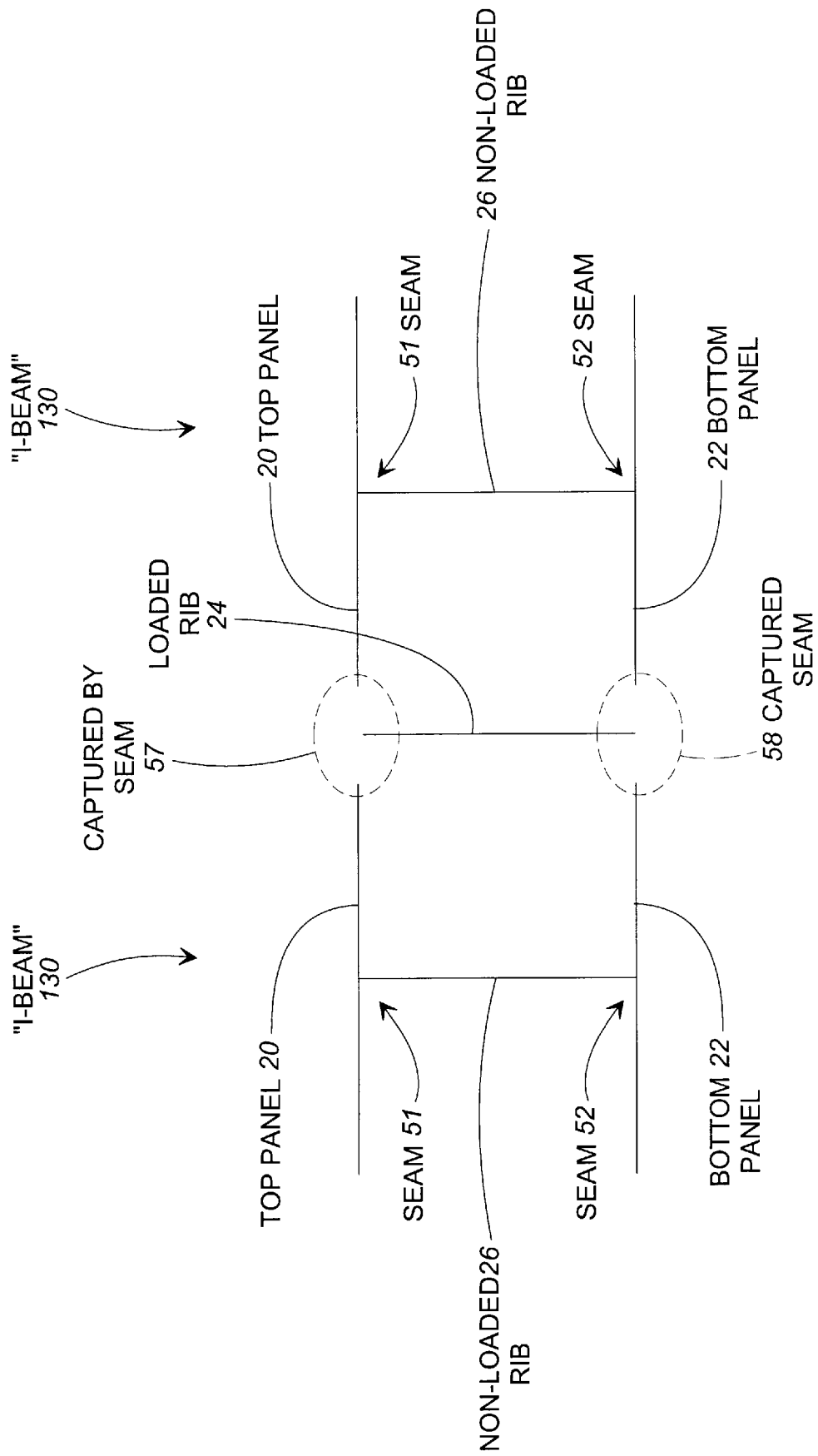
FIG. 12 is an end view of two I-beam subassemblies 130 each of which consists of a non-loaded rib 26, a top panel 20 and a bottom panel 22.

Two different rib panels are used in the airfoil configuration in FIGS. 1–4, non-loaded rib panels 26 and loaded rib panels 24 which combine to link and attach the upper and lower airfoil walls or "skins". Every other rib panel is a loaded rib panel 24, separated by nonloaded rib panel 26. As discussed in detail later, loaded rib panels have their upper edges attached to a side edges of two adjacent top panels 20, and their lower edges attached to a side edges of two adjacent bottom panels 24. Non-loaded rib panels 26 have their top edges attached to the underside "middle" of one top panel 20 and the topside "middle" of one bottom panel 24. In fact, the combination of a non-loaded rib 26, a top panel 20 and a bottom panel 22 comprises an "I-beam" subassembly 130 as shown in FIG. 12. As discussed in detail later, these I-beam subassemblies 130 are attached via intermediate loaded ribs 24 to create the overall airfoil.

As noted above, loaded and non-loaded ribs start from blanks having similar, and preferably substantially identical, blank forms. However, loaded rib blanks have flares (see as 96 in FIG. 7) attached to them to allow suspension lines to be attached thereto. Loaded and non-loaded rib panels may also differ by the existence of cross-ports 98 (see FIG. 7) which allow for some lateral air cross-flow, which can be desirable upon initial deployment of the parachute.

Figure 7:
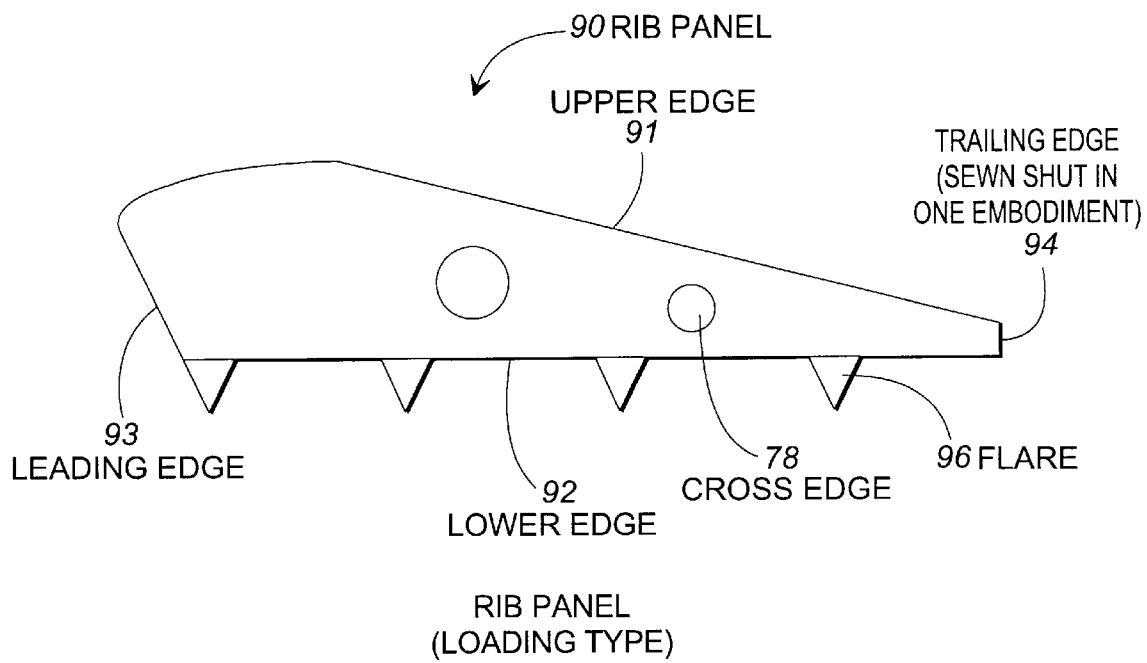
FIG. 7 is a top plan isolated view of a first loaded rib configuration including a first rib blank having two cross-flow ports and four flares attached thereto. It should be understood that a non-loaded configuration is also possible using this blank form without ports and without flares.
Figure 8:
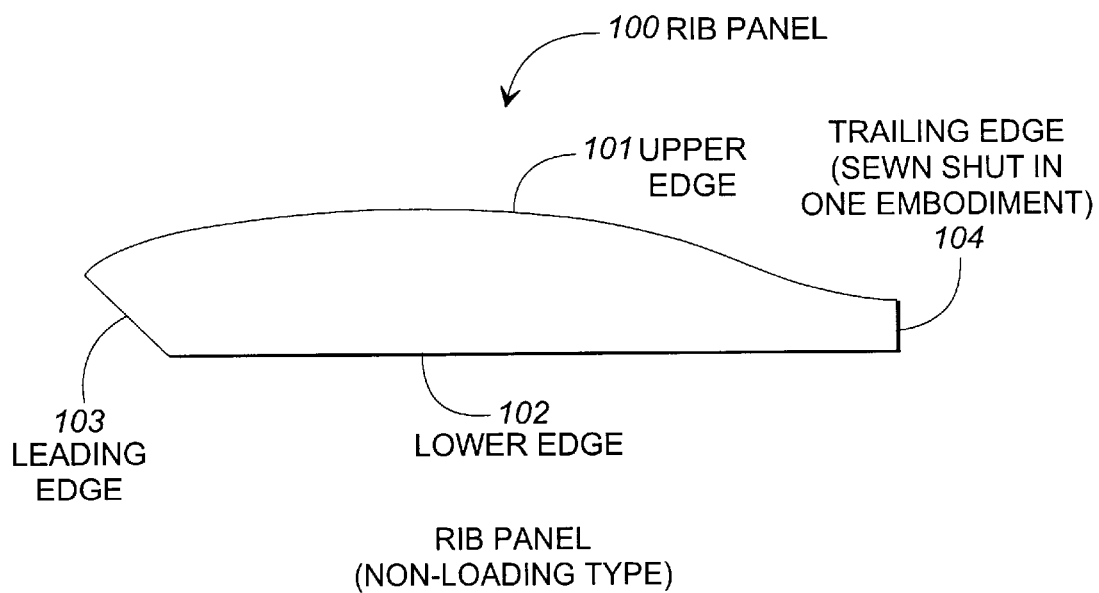
FIG. 8 is a side plan isolated view of a second rib blank 100, being a non-loaded rib configuration not including cross-flow ports. It should be understood that a loaded configuration could be provided which has flares attached thereto, and may have optional cross-flow ports.

In consideration of the above, explanation of FIGS. 7 and 8 is now made. FIG. 8 shows a first rib panel configuration 90, which is a loaded type rib panel. This rib panel 90 includes an upper edge 91, a lower edge 92, a leading edge 93, and a trailing edge 94. Flares 96 (4 in number) are attached to the lower edge of the main body of the rib panel 90. Cross ports 78 are likewise provided in the body of the rib panel 90.

It should be understood that the airfoil of the present invention includes a "closed" trailing end as known in the art; the small length of the trailing "edge" of the ribs is for seam allowance purposes as known in the art.

It may be understood that a nonloaded-type rib panel may also be used under the configuration shown in FIG. 7. Such a rib panel would not include the flares 96 (they are not needed as no load is being providing on a nonloaded rib by suspension lines). The cross-ports may or may not be used if desired.

FIG. 8 shows a second configuration of a rib panel 100, which as may be seen includes a different general outline than that shown in FIG. 7.

This rib panel 100, which is shown in its non-loaded configuration, includes an upper edge 101, a lower edge 102, a leading edge 103, and a trailing edge 104. As indicated above, either non-loaded or loaded-type roof configuration may be used including the outline of the panel shown in FIG. 8. If so desired, a loaded-type panel could be provided by adding flares such as shown in FIG. 7. Cross-ports may likewise by used if so desired.

5. The Valve Panels

Figure 9:
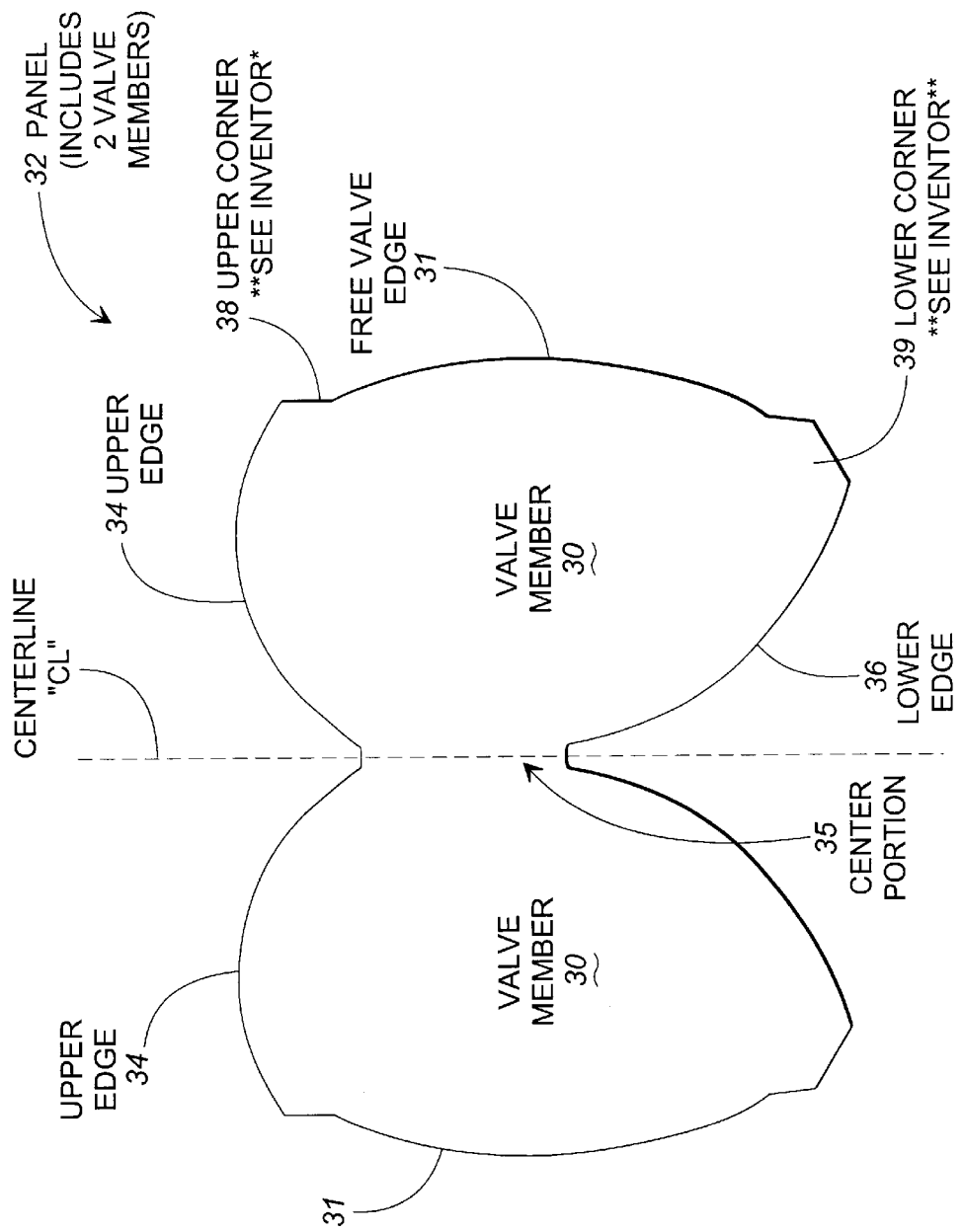
FIG. 9 is a plan isolated view of a first type of valve panel blank, which includes two valves 30.
Figure 10:
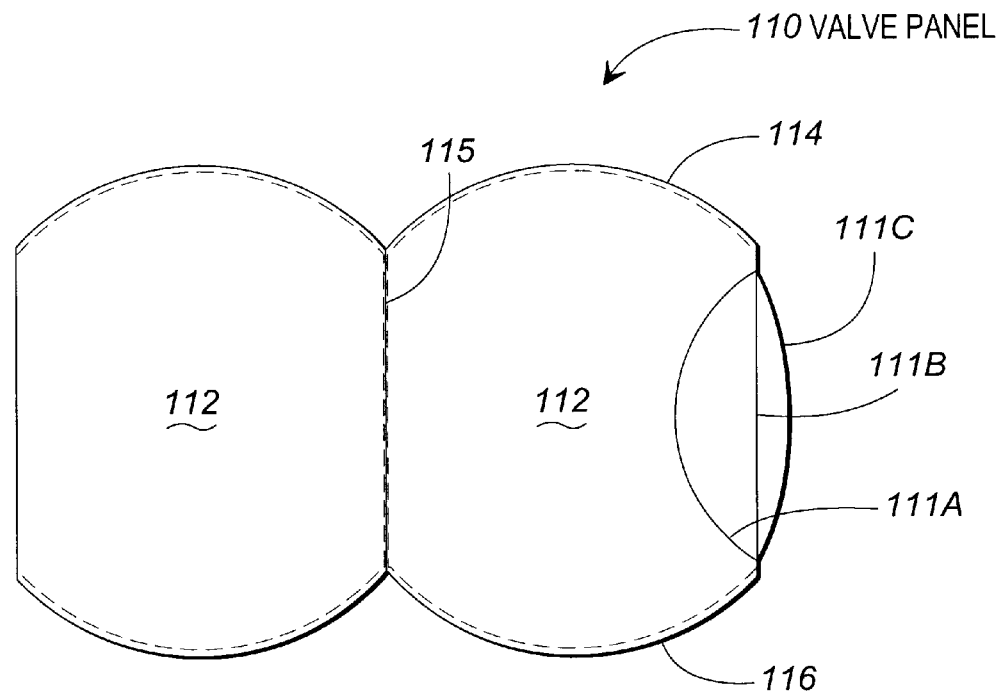
FIG. 10 is a plan isolated view of a second type of valve panel blank 110, which includes two valves 112.
Figure 11:
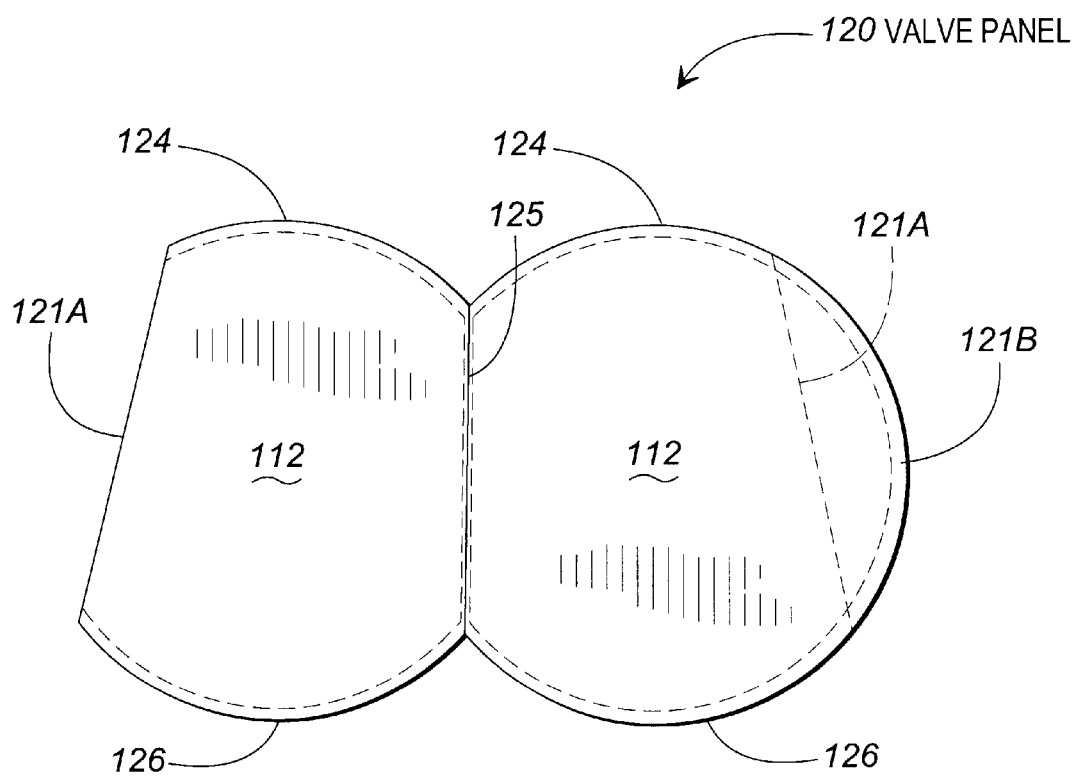
FIG. 11 is a plan isolated view of a third type of valve panel blank 120, which includes two valves 122.

Under the first embodiment configuration shown in FIGS. 9, individual valves or valve members 30 are provided by the use of a single valve panel 32 which in the preferred embodiment is a single panel of fabric.

FIG. 9 is a plan isolated view of a first type of valve panel blank. The valve panel is symmetric about its centerline "CL", and includes two valves 30, one on each side of the centerline. The valve panel 32 includes an upper edge 34, a lower edge 36, a pair of free valve edges 31, two upper corners 38 and two lower corners 39.

When installed, the valve panel 32 extends into the mouth of two adjacent air channels. The center of the valve panel is attached to the leading edge of a nonloaded rib panel. The upper edge of each valve in the valve panel is attached to a corresponding top panel on each side of the nonloaded rib. The lower edge of each valve in the valve panel is attached to a corresponding lower panel on each side of the non-loaded rib.

The free valve edge may be reinforced with tape sewn along the free valve edge to prevent fraying. Other reinforcing means may also be added without departing from the spirit and scope of the present invention.

Besides the embodiment shown above, which includes a free valve edge extending the height of the airfoil, the valve can be partially closed, under the present invention, by sewing part of the otherwise free edges to the loaded ribs. Such sewing as may be understood provides less flow past the valve.

The corners shown in the panel shown in FIG. 9 are sewn into the seams, with the "flat spots" on the corners substantially aligning along and fitting within the seams.

B. Interaction of Various Elements

Interattachment of the various elements included in the first airfoil embodiment 10 according to the present invention is now discussed. The particular method of assembly to provide such a construction will be described later in this application.

FIG. 12 is a good starting point to describe the interattachment of the various elements according to the present invention. As shown in FIG. 12, the overall construction can be considered as being formed of individual "I-beam" assemblies 130. These I-beam assemblies 130 (two shown in FIG. 12) are assembled together by means of intermediate loaded ribs 24, in order to provide the overall airfoil assembly 10.

Each I-beam assembly 130 includes a top panel 20, a bottom panel 22, and a non-loaded rib 26. The upper edge of the non-loaded rib 26 is attached by a seam 51 to the underside of the top panel 20 by sewing means and methods known in the art. The bottom edge of the non-loaded rib 26 is attached to the top side of a bottom panel 22 by a seam 52 by sewing means and methods known in the art. A valve panel (having two valves) is then sewn into the I-beam assembly such that the center portion (such as 35 in FIG. a) is sewn to the leading edge of the nonloaded rib, and the upper and lower edges of the valve panel are also sewn into the I-beam as discussed elsewhere in this application. Adjacent I-beam assemblies 130 are then connected together by means of seams 57 and 58, which both attach I-beam assemblies 130 together, and provide a loaded rib 24 intermediate them. Valves pre-sewn to the front edge of the nonloaded ribs 24 are also sewn in place upon installation of the loaded ribs.

Figure 3:
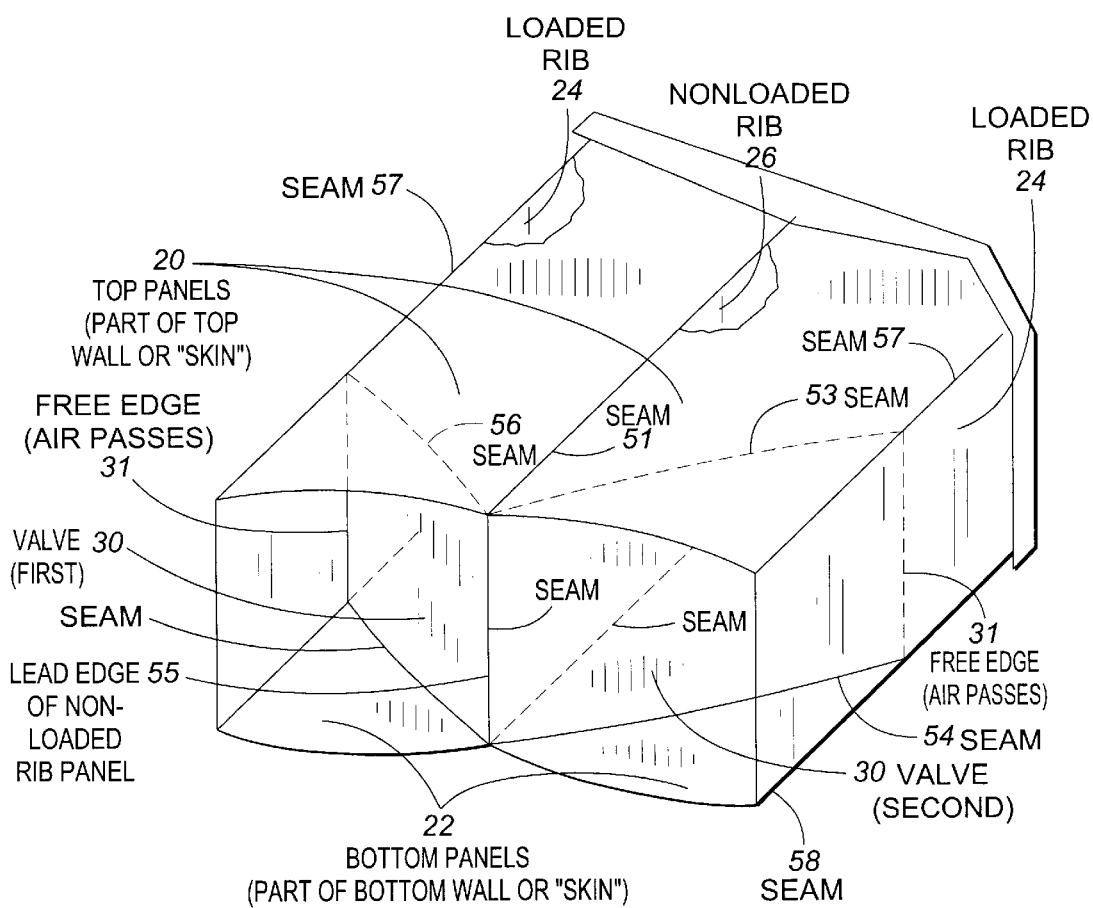
FIG. 3 is a pictorial detailed view of one cell, which includes two complete air channels, showing the two valves inside the two air channels. The valves are adjacent to but are not attached to the two vertically-oriented load-bearing rib panels 24 also shown.

After understanding the configuration shown in FIG. 12, reference may now be made to the configuration shown in FIG. 3, which shows a single I-beam assembly (having a valve panel attached thereto), with the two loaded ribs 24 shown attached at its sides. FIG. 3 may therefor be understood including a single nonloaded rib, a single top panel 20, a single bottom panel 22, and two loaded ribs 24, and a single valve panel 32. Note that the valve panel 32 is shown as being just an "example" panel which could include any of the panels shown in this application.

The nonloaded rib 26 has its upper edge attached to the underside of the top panel 20 at a seam 51, as described earlier. The lower edge of the nonloaded rib 26 is attached to the top side of the bottom panel 22, at a seam 52, as described above. The upper edge of the valve panel 32 is attached to the underside of the top panel 20 at seam locations 53, 56. The lower edge 36 of the valve 30 is attached to the upper surface of the bottom panel 22 at seam locations 54, 55. Seam locations 53, 54, 55, and 56 are at approximately 45 degree angles, although other angles are contemplated such as between 20 to 60.

The top panel 20 has two opposing side edges, each of which are attached to an upper edge of each of the two loaded ribs 24, at seam locations 57. The side edges of the bottom panel 22 are attached at seams 58 to the lower edges of the loaded ribs 24. As may be seen, free edges 31 of the valve members allow for air to pass by the free edges 31 and immediately adjacent to the planar surfaces of the loaded ribs 24.

C. Assembly

Assembly is as follows:

1) Cut parachute panels
2) Prep the loaded panels with flares
3) Attach flares is attached to the loaded ribs to obtain the configuration such as shown in FIG. 7.
4) Prep the leading edges of top and bottom skins and non-loaded ribs with reinforcing tape.
5) Assemble a "I beam". This involves sewing the non-loaded ribs to the top panel and the bottom panel. This can be shown on page 10.
6) Attach the valves to the I-beam. This involves joining the valve to the leading edge on the non-loaded rib, sewing the valve to the top panel on both sides of the non-loaded rib, then sewing the valve to the bottom panel on both sides of the non-loaded rib. At this time you have the FIG. 3 assembly except for the loaded ribs.
7) Provide a seamed connection between the side edges of two adjacent top panels and the upper edge of an intermediate loaded rib. This begins assembly of the I-beams along with the loaded ribs.
8) Provide a seamed connection between the side edges of two adjacent bottom panels and the upper edge of an intermediate loaded rib. This process is completed when a desired airfoil width is achieved, whereupon final loaded ribs are provide at the lateral edges of the airfoil to "cap" the ends.

D. Operation

Under one method of using the airfoil 10, a user jumps from an elevated position, such as out of an airplane, such that the airfoil unfurls along with the attached suspension lines as generally known in the art. As air begins to spread the airfoil, air likewise begins to enter the mouths of the air channels and past the valves, which are not yet fully stretched across the air channels. As the rear edge of each of the air channels is sewn shut, the channels tend to inflate due to the "ram-air" effect.

As air enters the leading, open mouths of the cells, air passes the valves and fills up the channels, such that air pressure tends to fill the channels, essentially "blowing them up". The valves tend to only allow air to pass into the air channels. This gives the overall assembly a desired firmness and structural integrity, this essentially providing an airfoil which provides winglike flight characteristics.

As may be generally understood, as an enclosure of fabric is "blown up" and maintains an internal air pressure which is higher than atmospheric, it tends to maintain some degree of rigidity. By way of example, an air mattress which is filled even to a relatively low pressure will tend to maintain its elongate, planar shape and to certain extend resist folding or twisting due to the tension provided in the fabric comprising the air enclosure.

The above-referenced "air mattress" effect analogy can be applied to the embodiment according to the present invention, to describe it advantages over prior art configurations. In essence, the "air mattress" provided by the present invention extends all the way to the front edges of both the top and the bottom panels of the airfoil according to the present invention. This is believed to provide improved stability features over known prior art configurations.

Figure 4:
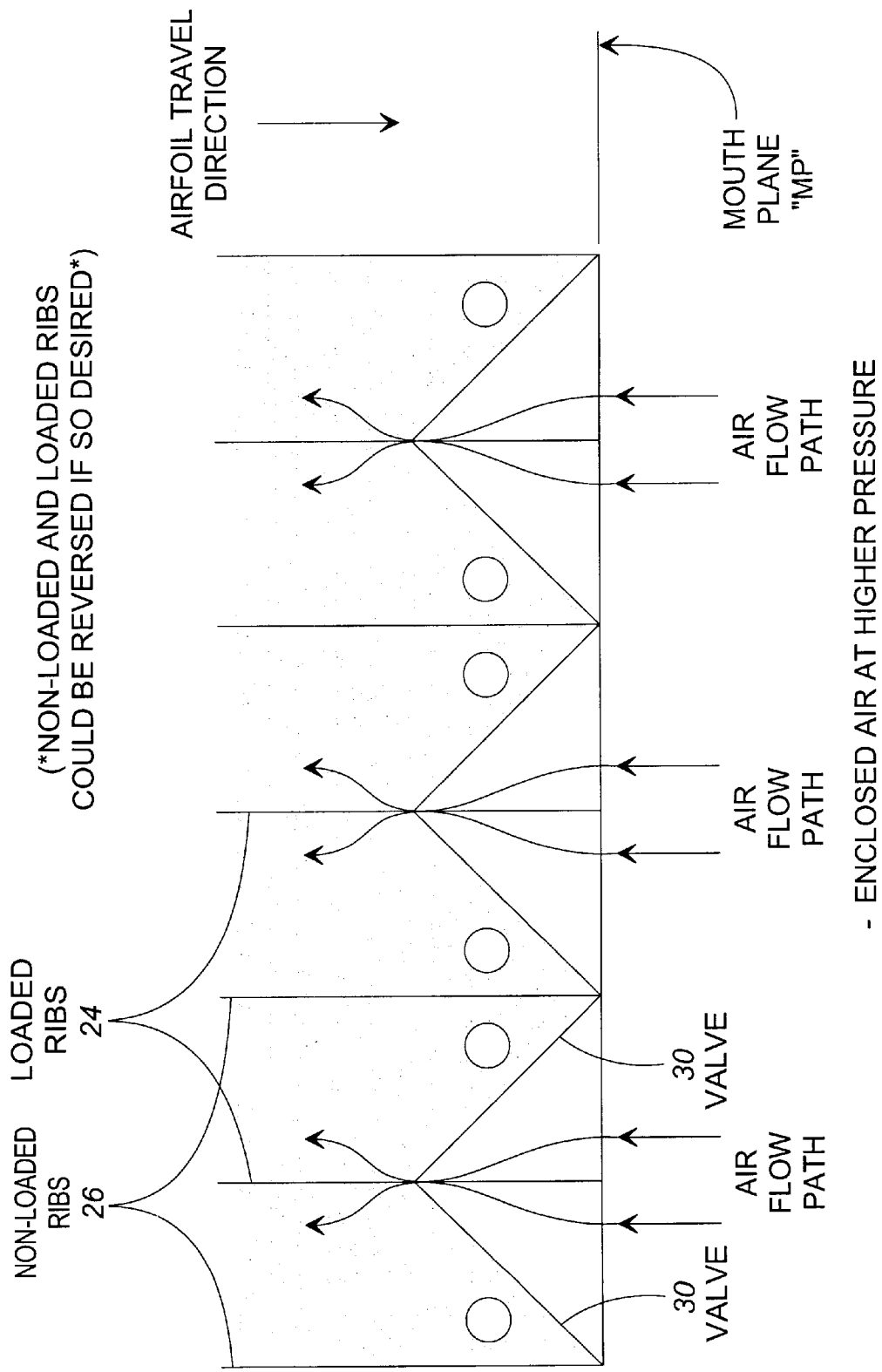
FIG. 4 is a top cross-sectional view through three cells, with the arrows again showing the passage of air past the free edges of the valves. The shaded area shows the area which is "pressurized" when the unit is inflated and the valves close.

Reference is particularly made to FIG. 4 to describe this phenomenon. As may be seen, when the configuration is inflated, air pressure "P" exists all the way to the front edges of the loaded ribs. As the loaded ribs all lie within the general mouth plane "MP" of the airfoil, it may therefore be said that air pressure exists all the way to the general mouth plane "MP" of the airfoil. This provides stability all the way to the mouth plane "MP" of the airfoil, which is believed to be an advantage in that it keeps the mouth open and maintains the form of the loaded and the unloaded ribs intact.

The air pressure which develops within the airfoil also provides some degree of rigidity to the vertical seams 50 between the valve panels and the nonloaded rib panels.

E. Advantages

The present invention provides an airfoil which includes many advantages over the known prior art. These advantages generally include advantages relating to operation and assembly.

With respect to operational advantages, as may be understood, the structural ribs tend to be substantially taut when the airfoil is in use and the suspension lines are loaded. As the fabric of the structural ribs is substantially vertical during such use, this may be seen to provide a substantially taut, planar surface against which the free edges of the valves may bias. This is an advantage over the known prior art, which does not include biasing of valves of the inventive configuration against a vertical, taut, fabric surface.

The present invention also provides an improvement over the prior art by providing a configuration which provides air pressure-assisted stabilization of the top leading edge of the canopy. The leading edge of the airfoil may be understood as being composed the leading edges 71 of the top panels 70. As discussed above, this is supported by pressure within the foil.

As may be seen, the provision of the present invention of a seam defining a part of the cavity, said seam extending along the front edges of the non-loaded ribs, provides improved stabilization of the non-loaded ribs, which provides improved stabilization of the top front edge of the air foil according to the present invention.

In contrast, the front leading edge of the Germain design does not do this.

With respect to assembly advantages, as may be seen, especially when compared to the Germain configuration, this configuration is easier to produce, as it can be pre-assembled with I-beams, then the normal procedure can be continued.

F. Alternatives

Alternative designs may also be used without departing from the spirit and scope of the present invention. On such design is as shown in FIGS. 13 and 14.

Figure 13:
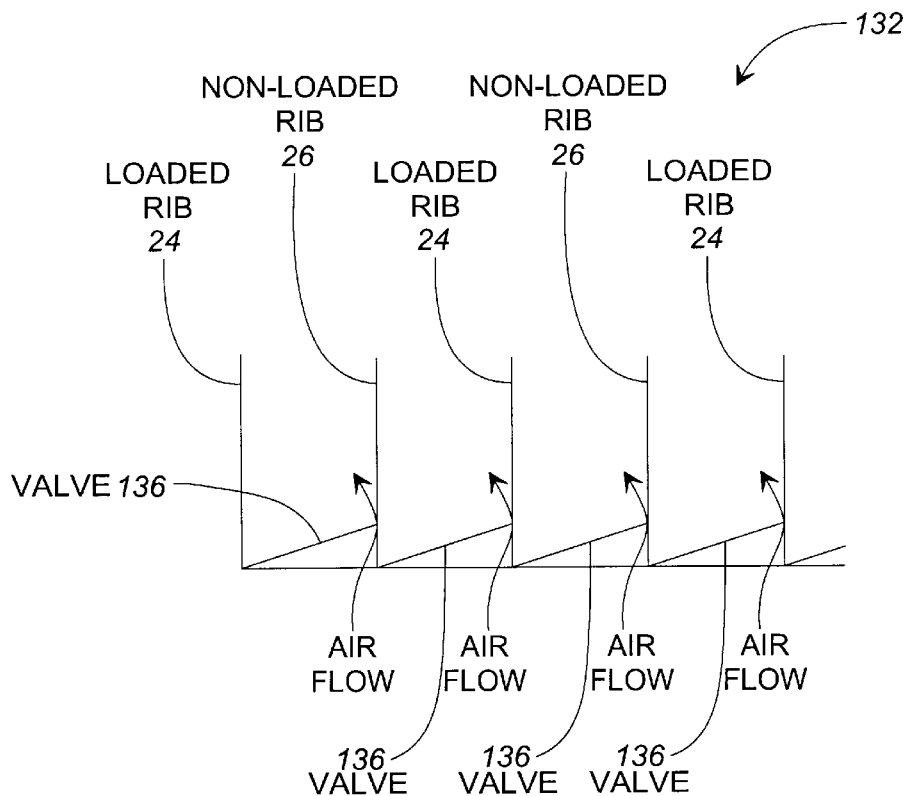
FIG. 13 is a top cross-sectional view of an alternate airfoil construction 132 which includes individual valves 136, all of which are oriented the same way. In this configuration, valves are alternately biased against loaded and non-loaded ribs 24, 26, respectively.
Figure 14:
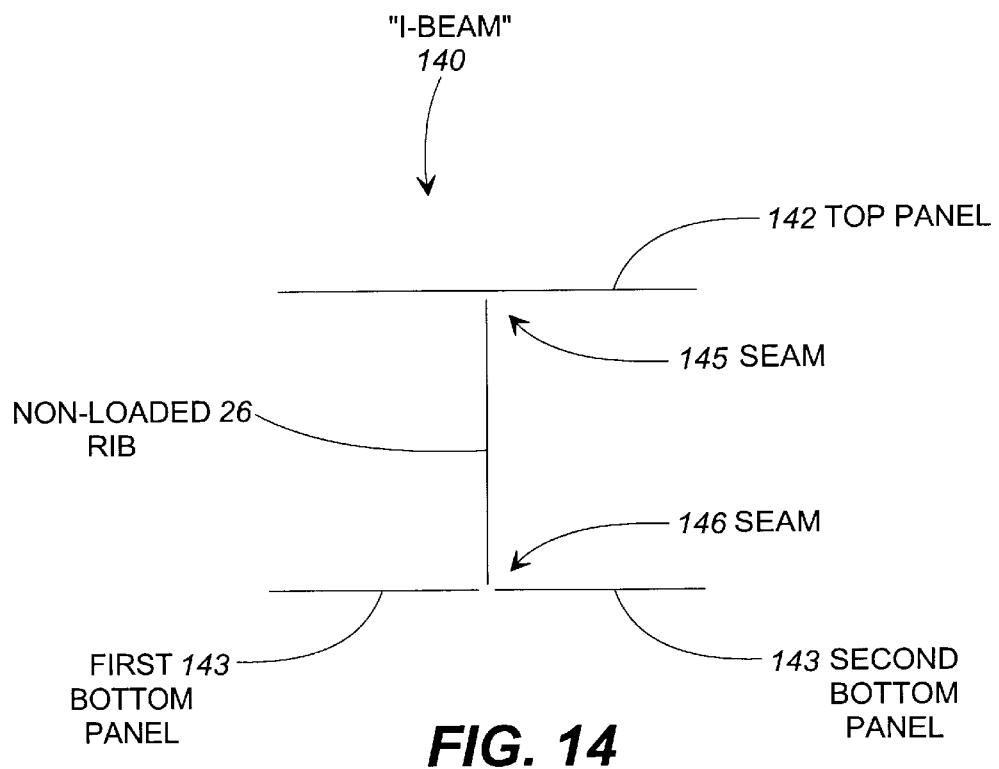
FIG. 14 is an end view of an I-beam subassembly 140 used in the configuration shown in FIG. 15, which consists of a non-loaded rib 26, a top panel 142 and two bottom panels 143.
Figure 15:
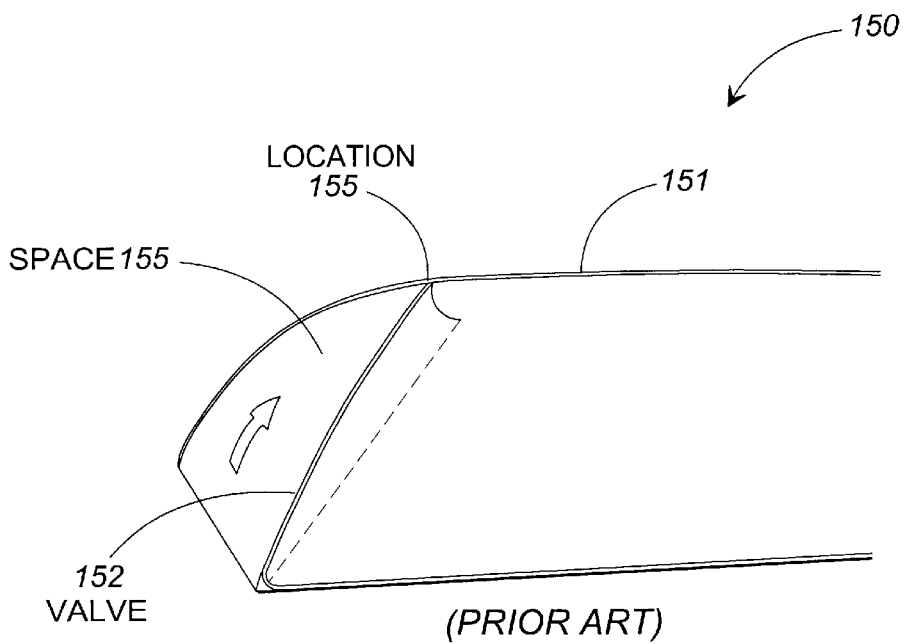
FIG. 15 is a prior art valve configuration.
Figure 16:
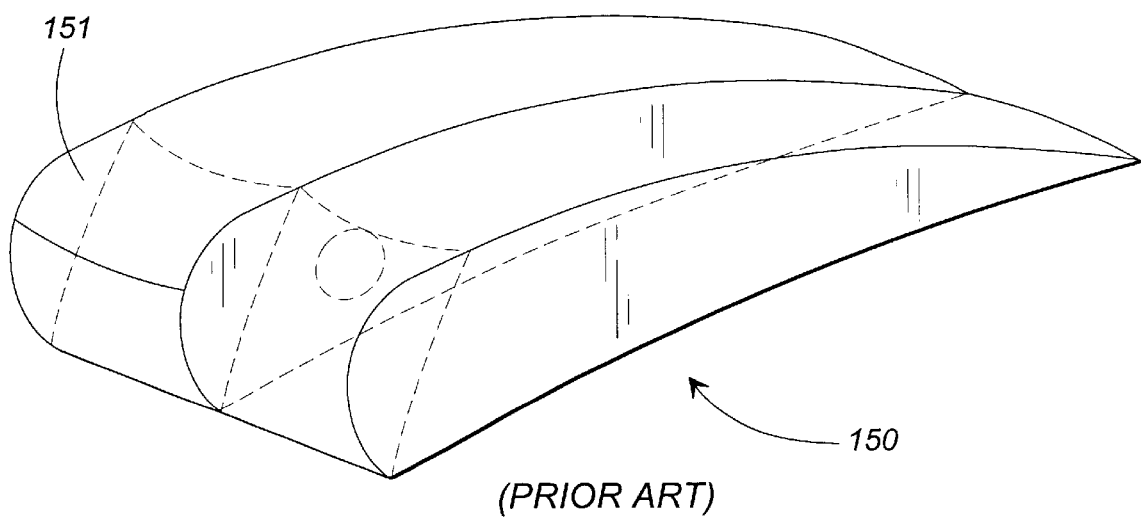
FIG. 16 is a prior art airfoil configuration.

FIG. 13 is a top cross-sectional view of an alternate airfoil construction which includes individual valves 136, all of which are oriented the same way. FIG. 14 is an end view of an I-beam subassembly 140 used in the configuration shown in FIG. 14, which consists of a non-loaded rib 26, a top panel 142 and two lower panels 143.

This alternate design includes the use of a plurality of air channels, with each valve biasing toward the same side of each air channel. In this situation, the valve bias against both loaded and non-loaded ribs.

Any of the configurations described above can also be used as a "powered canopy", which means being used with an alternate source of inflation other than that provided by "free fall". This includes a wind source such as by a wind-producing cart blowing air thereby.

G. Materials and Construction

The fabric use for the top panels, bottom panels, loaded ribs and non-loaded ribs can be fabrics such as known in the parachuting art, including F-111 brand fabric and zero-porosity fabric.

III. Conclusion

Therefore it may be seen that he present invention provides a canopy-type parachute which includes improved stability features and lends itself to relatively easy assembly. Integral valves promote stability of the airfoil by not allowing rapid deflation of the airfoil, and their location and orientation within the airfoil promotes structural rigidly of the overall airfoil, even out to the front top edge of the airfoil. The valves in one configuration bias against a vertical, loaded rib which tends to provide a consistent taut and planar surface for the valves to bias and act against.

While this invention has been described in specific detail with reference to the disclosed embodiments, it will be understood that many variations and modifications may be effected within the spirit and scope of the invention as described in the appended claims.

What is claimed is:

1. An airfoil, said airfoil comprising:
   an upper layer;
   a lower layer;
   a plurality of substantially vertical rib panels interconnecting said upper and lower layer and defining at least one air channel for receiving air therein; and
   at least one valve panel portion, said valve panel portion having a free valving edge portion configured for bias against one of said vertical rib panel, but said free valving edge portion still being detached from said one of said vertical rib panels to allow said air to pass between said one of said vertical rib panels and said valving edge portion.

2. The airfoil as claimed in claim 1, wherein said free valving edge portion of said valve panel portion biases against a loaded rib which is pulled taut during loading of said airfoil.

3. An airfoil, said airfoil comprising:
   an upper layer;
   a lower layer;
   a plurality of substantially vertical rib panels each including a leading edge, said rib panels interconnecting said upper and lower layer and defining at least one air channel for receiving air therein; and
   at least one valve panel portion, said valve panel portion configured to be sewn to said leading edge of one of said vertical rib panels such that one of said vertical rib panels and said valve panel portion combine to provide a substantial enclosure which tends to be filled when air passes by said valve panel portion.

4. The airfoil as claimed in claim 3, wherein said enclosure extends to the top edge of said to panel portion.

5. The airfoil as claimed in claim 3, wherein said enclosure extends to the bottom edge of said to panel portion.

6. An airfoil, said airfoil comprising:
   an upper layer;
   a lower layer;
   a plurality of substantially vertical rib panels interconnecting said upper and lower layer and defining a plurality of adjacent air channels for receiving air therein; and
   at least one valve panel, said valve panel including two valve panel portions extending into two adjacent air channels.

7. The airfoil of claim 6, wherein said plurality of vertical rib panels includes a first rib panel, and valve panel has its center attached to the front edge of a first of said vertical rib panel.

8. The airfoil of claim 6, wherein said first substantially vertical rib panel is a non-loaded rib panel.

9. The airfoil of claim 6, wherein said plurality of vertical rib panel further comprises second and third substantially vertical rib panels and wherein said valve panel includes two valve portions having opposite valve edges configured for biased valving against second and third corresponding vertical rib panels one on each side of said first vertical rib panel.

10. The airfoil of claim 6, wherein said first substantially vertical rib panel is a vertical non-loaded rib panel and said second and third substantially vertical rib panels are loaded rib panels.

* * * * *